United States Patent [19]

Ruben

[11] Patent Number: 4,487,822
[45] Date of Patent: Dec. 11, 1984

[54] GALVANIC CELL WITH TIN FLUOBORATE ELECTROLYTE

[76] Inventor: Samuel Ruben, 52 Seacord Rd., New Rochelle, N.Y. 10803

[21] Appl. No.: 390,387

[22] Filed: Jun. 21, 1982

[51] Int. Cl.³ .............................................. H01M 6/04
[52] U.S. Cl. ..................................... 429/199; 429/218
[58] Field of Search ............... 429/199, 200, 201, 218, 429/225-228; 423/276, 293, 89, 463, 472

[56] References Cited

U.S. PATENT DOCUMENTS

| | | | |
|---|---|---|---|
| 2,457,798 | 1/1949 | Ferguson | 423/276 |
| 3,432,256 | 3/1969 | Wilson | 423/276 |
| 4,020,240 | 4/1977 | Schlaikjer | 429/200 X |
| 4,204,034 | 5/1980 | Schaer | 429/200 X |

*Primary Examiner*—Charles F. LeFevour
*Attorney, Agent, or Firm*—Ronald S. Cornell; Israel Nissenbaum; Leon Robbin

[57] ABSTRACT

The invention is the utilization of an aqueous solution of tin fluoborate as the electrolyte in galvanic cells. It is particularly useful in primary galvanic cells employing permanganate depolarizers.

4 Claims, No Drawings

GALVANIC CELL WITH TIN FLUOBORATE ELECTROLYTE

This invention relates to an electrolyte for galvanic cells.

In a number of my U.S. patents, including U.S. Pat. No. 2,463,316, issued Mar. 1, 1949, I describe a cell comprising a cathodic reactant of potassium permanganate, a zinc anode and a zincated potassium hydroxide electrolyte. In this cell, over a period of time, local reduction and solubility of the permanganate into the alkaline electrolyte took place, resulting in limited shelf life and reduction in cell capacity.

In my U.S. Pat. No. 4,306,005, issued Dec. 15, 1981, I describe a cell employing a saturated lithium hydroxide electrolyte having a zincated content, a potassium permanganate-graphite reactant and an amalgamated zinc anode. This cell exhibits long shelf life compared with cells employing an electrolyte of potassium or sodium hydroxide, and by adding a substantial amount of lithium hydroxide powder to the potassium permanganate graphite, a more complete use in depth to the depolarizing oxygen component of the cathode is obtained.

In my co-pending patent application Ser. No. 06/293,102 filed Aug. 17, 1981 now abandoned, I describe a potassium permanganate cell having an alkaline phosphate electrolyte such as sodium tri-orthophosphate.

The present invention is an improvement over the cells of my above mentioned previous patents and copending patent application.

I have found that aqueous solutions of tin fluoborate (Sn $BF_4$)$_2$ in concentrations such as 20% to 50% have the unexpected property of not dissolving most of the solid permanganates of the alkali or alkaline earth metals, for example the permanganates of potassium, barium and calcium, and that this characteristic allows the efficient use of those permanganates in galvanic cells with long cell shelf life and minimal reduction of capacity.

When potassium permanganate is used as the cathodic reactant in a cell with the fluoborate electrolyte, it is mixed with 10% by weight of micronized graphite so as to make a conductive cathode and pressed into a disc, cylinder or other shape, dependent upon the desired cell structure.

Maximum conductivity between the potassium permanganate and the micronized graphite may be obtained by preparing a mixture or suspension of micronized graphite in a saturated hot solution of potassium permanganate. The permanganate is dissolved in water at 90° C. to saturation, 10% of the permanganate weight of micronized graphite is added and the mixture continuously stirred at 100° C. and exposed to the atmosphere over a wide surface until enough evaporation of the water occurs and integrally mixed crystals of permanganate and graphite are produced. Continuous mixing is essential for maintenance of a 90–10 mixture to avoid separation during cooling. This method assures maximum contact between the ionic and the electronic conductors.

For cells of cylindrical construction, a cathodic reactant can also be produced by impregnating a porous conductive vitreous carbon or reticular graphite cylinder with an aqueous supersaturated solution of the desired permanganate and heating to 90° C. or higher until the water content has been evaporated, the permanganate crystals being deposited within the pores or interstices of the cylinder. The preferred cylinder is one made of pyrolytic graphite, produced by reacting reticulated vitreous carbon with a hydrocarbon gas, such as methane or acetylene at a temperature of 2000° C., to deposit dense highly electrically conductive pyrolytic graphite on the reticulated vitreous carbon.

The solubilities of potassium, barium and calcium permanganates in 100 ml of water at 25° C. are: potassium permanganate 25 grams; barium permanganate 75.4 grams, and calcium permanganate 338 grams. At 90° C. the solubilities are higher.

I have found that in the tin fluoborate-permanganate cell system, the potential is mostly developed between the permanganate and the tin fluoborate electrolyte, the anode contributing only a small part. This differs from other galvanic systems where the potential is mostly developed at the anode, according to its oxidation potential. This allows a wide choice of anode materials, the preferred ones being tin and lead-tin alloys, such as 70% lead −30% tin or lead, the potential range in such cells being in the order of 1.5 to 1.7 volts.

In utilizing the electrolyte of this invention various cell structures known to the art may be employed, such as the types shown in my U.S. Pat. Nos. 2,422,045, for example FIG. 15, and 2,463,316, FIG. 4. Cells may be made with all liquid electrolyte or electrolyte absorbed in spacer material such as point bonded Pellon (non-woven poly-propylene) and with a barrier such as a composite of grafted stable polymer such as Permion, to prevent migration of the micronized graphite. The terminal contact with the electrolyte or the cathode should have a graphite surface.

The tin fluoborate may be made by reacting boric acid with a solution of hydrofluoric acid to form Fluoboric acid ($HBF_4$) then adding hydrated tin oxide until the reaction to tin fluoborate Sn ($BF_4$)$_2$ occurs in solution. The concentration of tin fluoborate in the aqueous solution may be from 25% to 50%. If desired, the tin fluoborate electrolyte may be immobilized by the addition of suitable gelling agents, such as the polyvinyl alcohols or carboxy methyl cellulose.

Tin fluoborate is the preferred electrolyte although tin fluosilicate may be used with tin or lead anodes for some applications.

For high current output cells utilizing a tin fluoborate electrolyte, other cathodic reactants can be substituted for the permanganates, such as lead dioxide, manganese dioxide, cupric oxide or sulfide, and many other conductive cathodic reactants. The maxium potential appears to be obtained with lead dioxide cathodes. In these cells, the potential developed is dependent upon the anode oxidation potential.

I claim:

1. A primary cell having an electrolyte of tin fluoborate, a cathodic reactant and an anode, characterized in that the cathodic reactant is a permanganate of the alkali or alkaline earth metals.

2. The cell of claim 1 characterized in that the cathodic reactant is one selected from the group consisting of potassium permanganate, barium permanganate, and calcium permanganate.

3. The cell of claim 1 characterized in that the cathodic reactant is barium permanganate.

4. The cell of claim 1 characterized in that the anode is a metal selected from the group consisting of lead, tin, and lead-tin alloys.

* * * * *